(No Model.) 4 Sheets—Sheet 1.

W. HADDOCK.
CROSSING FOR CABLE RAILWAYS.

No. 399,036. Patented Mar. 5, 1889.

Attest.
C. W. Bogart.
W. A. Hicks.

Inventor.
Worcester Haddock
per Strehli & Hill
Attys.

(No Model.) 4 Sheets—Sheet 2.

W. HADDOCK.
CROSSING FOR CABLE RAILWAYS.

No. 399,036. Patented Mar. 5, 1889.

Attest.
C. W. Bogart,
W. A. Hicks,

Inventor.
Worcester Haddock
per Strehli & Hill
Attys.

(No Model.) 4 Sheets—Sheet 3.
W. HADDOCK.
CROSSING FOR CABLE RAILWAYS.
No. 399,036. Patented Mar. 5, 1889.
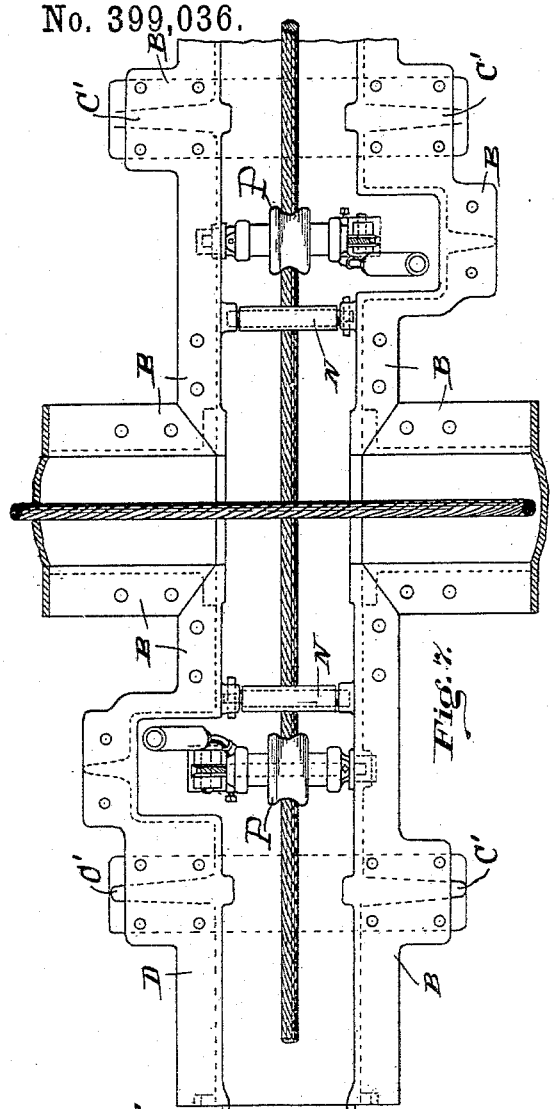
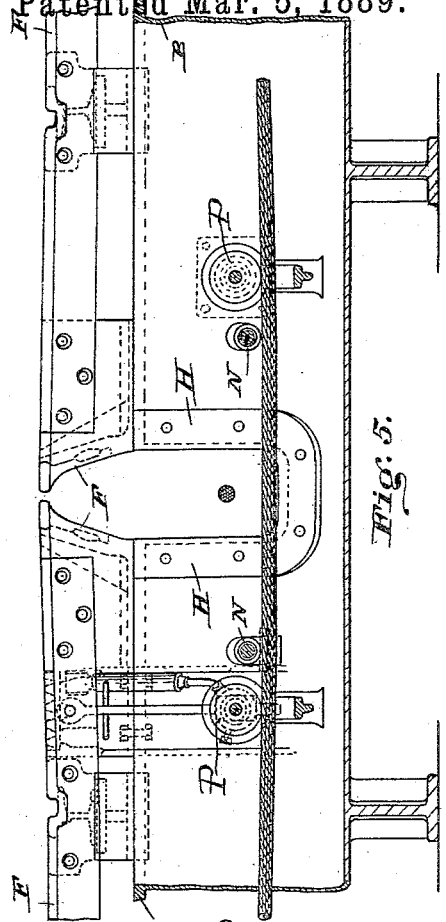
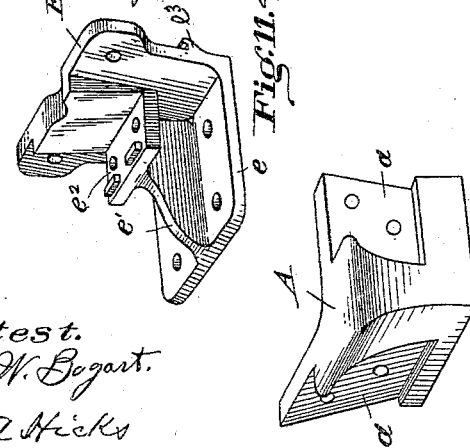
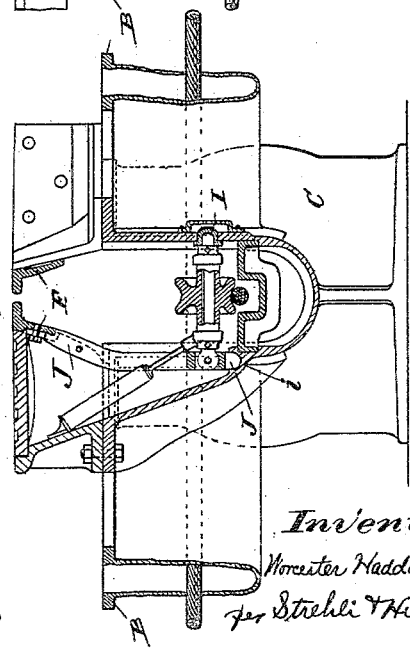
Attest.
C. W. Bogart.
W. A. Hicks
Inventor:
Worcester Haddock
per Strehli & Hill
Attys.

(No Model.)  4 Sheets—Sheet 4.
W. HADDOCK.
CROSSING FOR CABLE RAILWAYS.
No. 399,036. Patented Mar. 5, 1889.
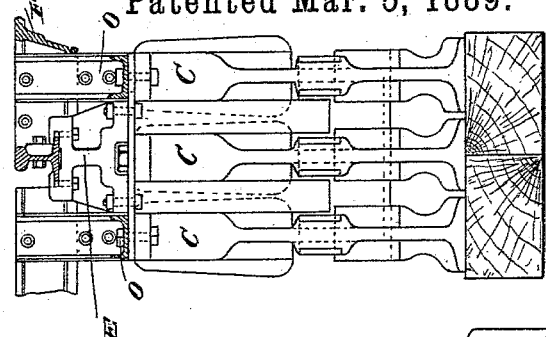
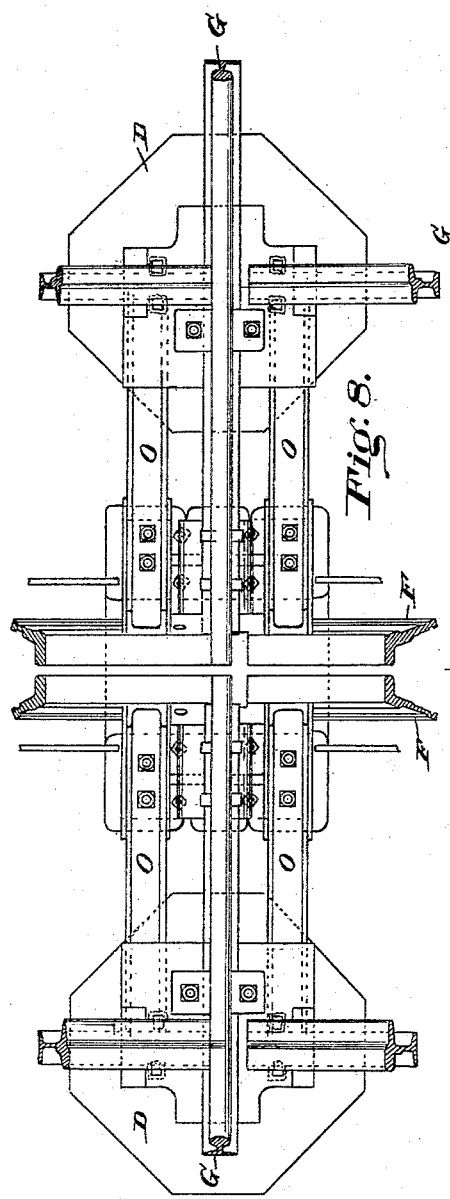
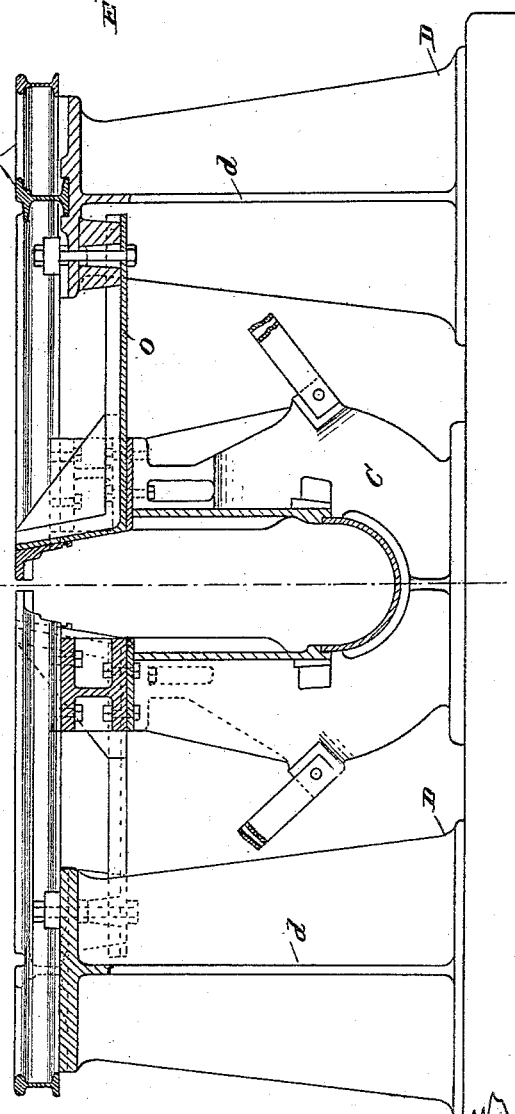
Attest.
C. W. Bogart.
W. A. Hicks.
Inventor.
Worcester Haddock
per Strehli & Hill
Attys.

UNITED STATES PATENT OFFICE.

WORCESTER HADDOCK, OF CINCINNATI, OHIO.

CROSSING FOR CABLE RAILWAYS.

SPECIFICATION forming part of Letters Patent No. 399,036, dated March 5, 1889.

Application filed July 2, 1888. Serial No. 278,850. (No model.)

*To all whom it may concern:*

Be it known that I, WORCESTER HADDOCK, a citizen of the United States, and a resident of Cincinnati, Hamilton county, State of Ohio, have invented certain new and useful Improvements in Crossings for Cable Railways, of which the following is a specification.

The object of my invention is to provide a means of joining and securing together intersecting slot and tram rails of varying configurations of outline where two lines of cables cross, as will hereinafter appear.

Figures 1, 2:
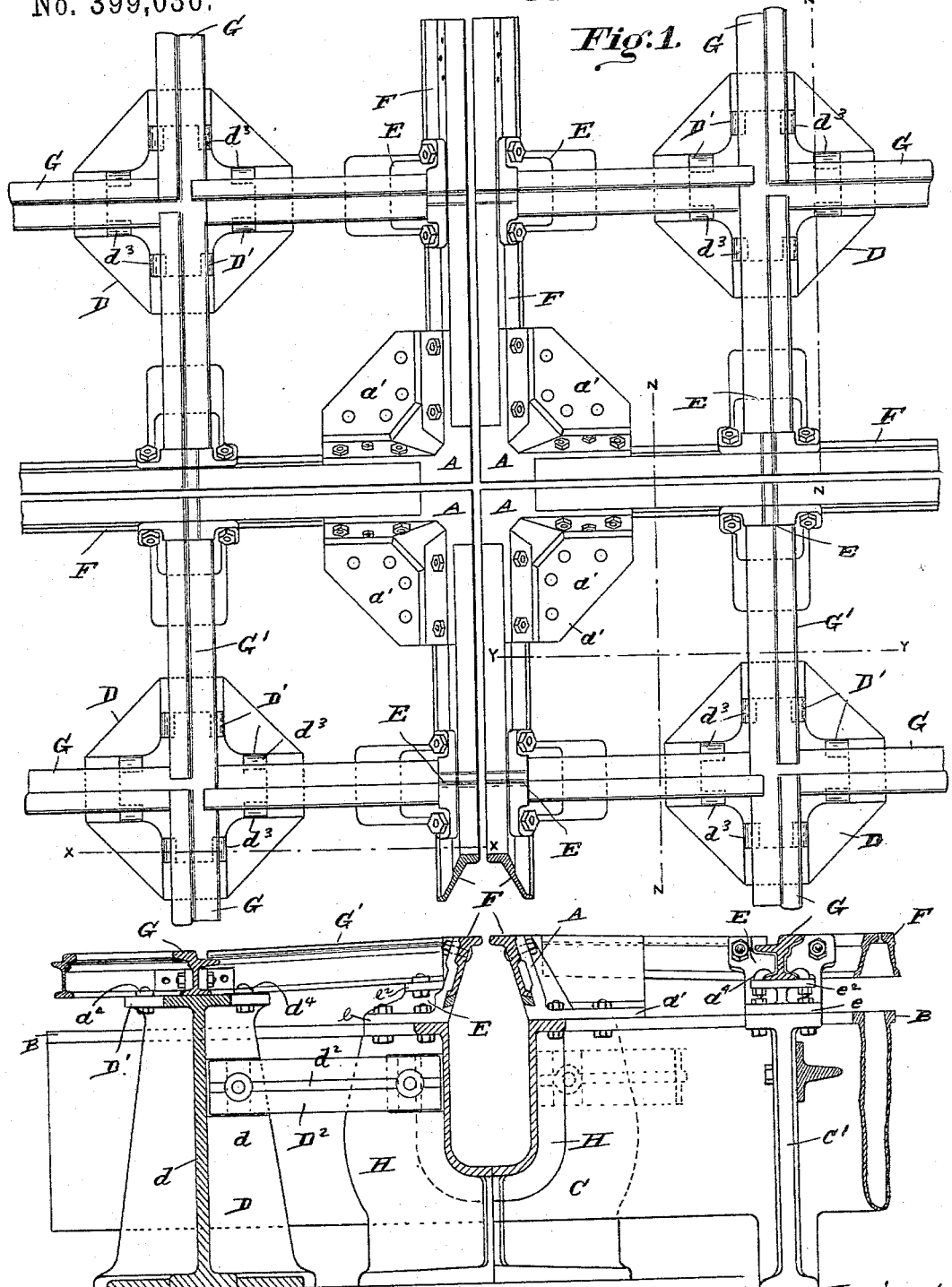
Figures 3, 4:
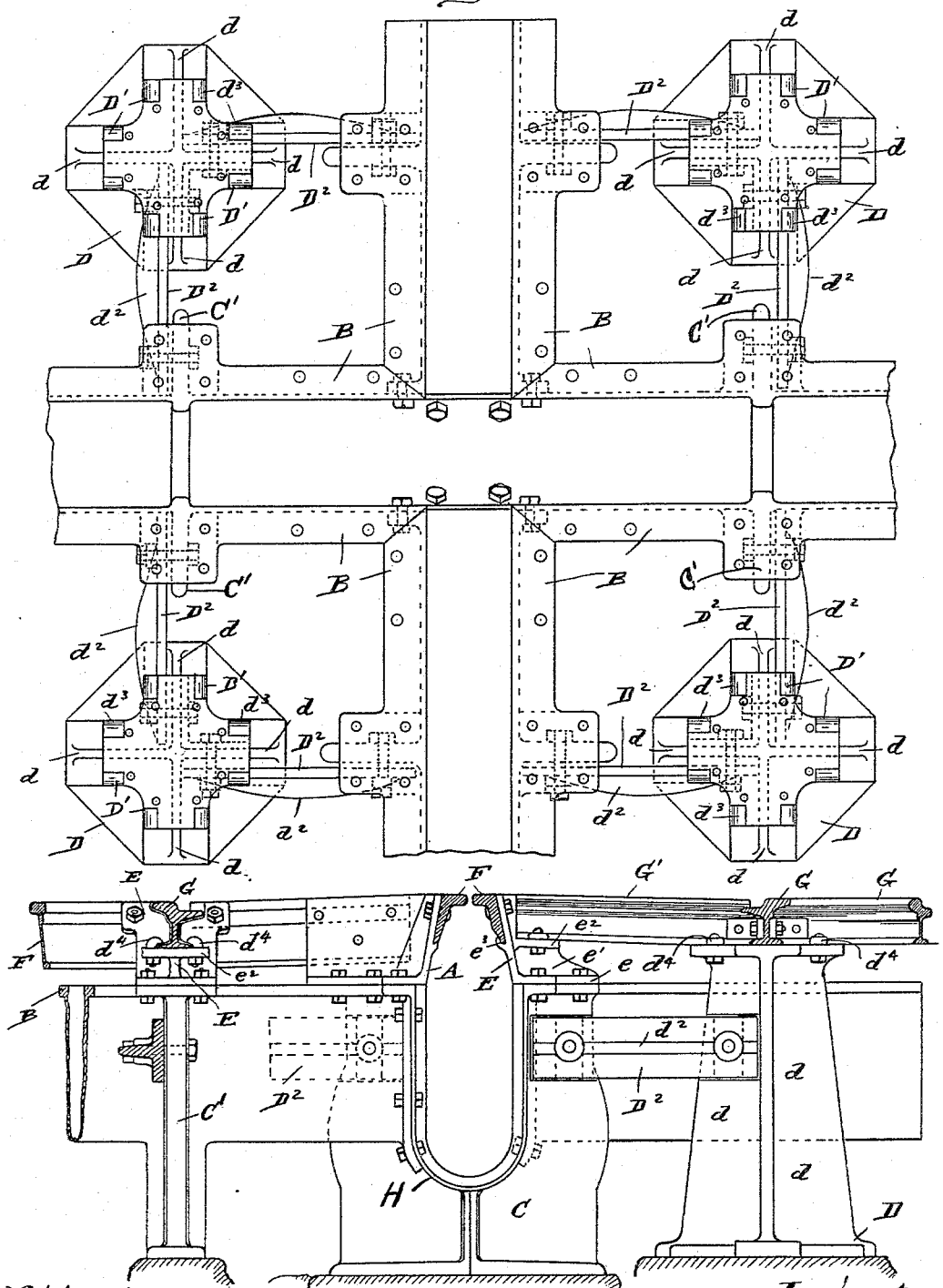

In the drawings accompanying this specification and forming a part thereof, Figure 1 is a plan view of a crossing embodying my invention, the conduits not being shown. Fig. 2 is a compound section taken at the dotted lines $x\,x$ and $y\,y$ of Fig. 1, also through the conduits. Fig. 3 is a top view of a crossing with the slot and tram rails removed, showing the corner pedestals and flanges of the conduits, to which latter the corner castings and brackets are secured for retaining the slot and tram rails in proper position. Fig. 4 is a compound section taken at the dotted lines $z\,z$, Fig. 1. Fig. 5 is a longitudinal section through a portion of one conduit and an end view of the intersecting conduit, showing the position of the lower cable with reference to the depression-sheaves, also showing preferred mode of connection between the walls of intersecting conduits. Fig. 6 is a cross-section through a portion of one of the conduits and man-hole, showing in detail the preferred form of construction for the depression-sheaves at a crossing. Fig. 7 is a top view of a crossing with rails removed, showing the position of the safety pulleys or rolls, depression-sheaves, and cables in an operative position. Figs. 8, 9, and 10 are plan and sectional views, respectively, showing the application of the various patterns and designs used in the cable-crossing to a steam-railway and cable crossing. Fig. 11 is a perspective view of the outer face of one of the brackets for supporting the tram and slot rails. Fig. 12 is a perspective view of one corner piece or casting, in which the ends of intersecting slot-rails are secured.

My invention is preferably constructed as follows: To the top flanges, B, of the four intersecting walls of the conduit are bolted or suitably secured the corner pieces or castings, A, the two inner faces of which are at about right angles to each other and converge to a point, substantially as shown in Fig. 12. In each inner face of said corner castings are made the rabbeted portions $a$, of sufficient height and depth to accommodate the configuration of slot-rails to be used, as different lines of roads usually have different configurations of slot-rails. Each corner piece, A, is preferably cast of steel, and has a rearwardly-projecting base, $a'$, (see Figs. 1 and 2,) through which are passed suitable bolts made fast to the flanges B of the conduit, as aforedescribed.

At an angle of about forty-five degrees to crossing of the conduits, and at suitable distances therefrom, are embedded the corner pedestals, D, which are preferably cast with an octagonal base, D, terminating at top in the four extensions $D'$. These pedestals are preferably provided with the four vertical ribs $d$, which form the body of the pedestal; but said ribs may be dispensed with and the body made solid, if desired.

The corner pedestals are secured to place at proper distances from the conduits, and are secured thereto by means of the stay-rods or bars $D^2$, which are secured to the ribs $d$ of the pedestals and to the yokes C of the conduits, as shown in Figs. 2, 3, and 4, said bars $D^2$ being preferably provided with suitable strengthening-ribs, $d^2$.

Each of the extensions $D'$ of the pedestals has two lugs, $d^3$, between which the base of the tram-rails rest, to prevent any lateral movement of the rails thereon, said rails being secured to said extensions by suitable clamps or hooked bolts, $d^4$.

To each side of the conduits are cast the vertical strengthening ribs or yokes $C'$, the flanges B of the conduits over said ribs being widened out, as shown in Fig. 3, to admit of the brackets E being bolted thereto. These brackets are preferably cast as shown in Fig. 11, having a base, $e$, vertical rib $e'$, on which is cast the platform $e^2$, and an inner hooked rib, $e^3$, in which the slot-rails rest when in position.

The slot-rails F are secured to place on the conduits by means of the aforedescribed corner pieces or castings, A, and the brackets E. The corner castings are secured to the intersecting flanges B of the conduits, and the inner ends of the slot-rails are bolted in the rabbeted portions $a$ (see Fig. 12) of said castings. The slot-rails are also bolted to the brackets E, as shown in Figs. 2 and 4, and rest in the hooked rib $e^3$, as shown.

The tram-rails G are secured to place by being clamped or bolted to the extensions D' of the pedestals between the lugs $d^3$. The inner ends of the tram-rails, at their intersection with the slot-rails, are secured to place by being clamped or bolted to the platform $e^2$ of the bracket E. It will be seen that one set of tram-rails must be cut away at their intersection with the continuous tram-rails and a slot tram-rail, G', (see Figs. 2 and 4,) interposed between the continuous intersecting tram-rails and the slot-rails of the conduit.

By means of the aforedescribed construction I am enabled to construct a crossing for tram and slot rails of varying configurations. The corner pieces or castings, A, form a secure protection at the intersection of the slot-openings, the corners being of solid steel.

The tram and slot rails of the line in which the lower cable travels describe a slight vertical curve at each side of the intersecting slot-rails, so that when the car is driven over the crossing by momentum the downward curve will carry the car free of the crossing cable line by force of gravity.

Where the two conduits cross or intersect, it is necessary to cut away a portion of the sides of one conduit to permit the cable in the other conduit to have free play over or beneath the cable in the conduit so cut away. These openings are of substantially the configuration of the intersecting conduit, the end walls of said last-named conduit being provided with a suitable flange, H, (see Figs. 2 and 4,) which is riveted or bolted to the sides of the conduit so cut away and around said openings. This mode of connecting the intersecting conduits is found to be very effective for that purpose.

It is evident that where two cables cross it is necessary that one of said cables shall travel beneath the one at an angle thereto. To accomplish this purpose, I have provided the two depression-sheaves P P, the shafts of said sheaves being secured to the conduit in the following preferable manner: In one side wall of the conduit is a journal, I, (see Fig. 6,) in which one end of the shaft rests when in place. The other end of said pulley-shaft is pivoted in an elongated opening in the lever-arm J, as shown in Fig. 6, the lower end of said arm resting in a grooved shoulder, $i$, located near the bottom of the man-hole in the side of the conduit. The top of this lever-arm is bolted or suitably secured to the slot-rail after the sheave has been placed in position. One end of said shaft being thus pivoted in the arm J permits of said shaft being inserted into the journal I laterally, after which the top of said arm is secured in the manner aforedescribed, thus securing said shaft in a non-rotatable position in the conduit.

When desired to remove either sheave for any cause, the lever-arm J is detached from the slot-rail, when the sheave, shaft, and lever are lifted from place through the man-hole. In addition to the two depression-sheaves P, it is preferred to employ two or more guard rolls or pulleys, N, (shown in Figs. 5 and 7,) which are secured in suitable journals in the sides of the conduit. These guards are for use only when the depression-sheaves are for any reason not present.

In connection with the depression-sheaves I have shown an attachment for oiling said sheaves, which is also of my invention, and for which an application for Letters Patent was filed June 9, 1888, Serial No. 276,600.

In Figs. 8, 9, and 10 I have shown a slight modification of the crossing as being applicable to a steam and cable railway crossing. In this case where the rails of the steam-road cross the cable-conduit it is preferred to use three or more yokes, C, as shown in Fig. 10, to afford additional strength. The rails are bolted to the bracket E, said bracket being attached to a plate made fast to the tops of said yokes, said bracket being of a design differing slightly from that used in two cable-crossings. Suitable pedestals are employed for the purpose aforedescribed. Instead of attaching the slot-rails of the conduit to the bracket, as aforedescribed, they are, when employed in latter connection, secured in place by being bolted or riveted to the channel-bars O, the latter being bolted to the yokes C and the pedestals, as shown.

The cable-crossing shown and described has been so shown with reference to two cable lines crossing at right angles; but if desired the same parts shown may be used where two or more lines cross at any other angle by slightly changing the shape of the corner castings and brackets.

What I claim as new, and desire to secure by Letters Patent, is—

1. In a crossing for cable railways, the corner pieces or castings, A, bolted or suitably secured to the top intersecting flanges of the conduits, said castings having the rabbeted portions $a$ in their inner faces corresponding in configuration to the slot-rails to be secured therein, substantially as set forth.

2. In a crossing for cable railways, the corner castings, A, secured to the top intersecting flanges of the conduits, said castings having their inner faces rabbeted to receive varying configurations of slot-rails, in combination with said slot-rails, and suitable brackets, as E, secured to the top flanges, B, of the conduits, said brackets being adapted to retain the slot and tram rails in their relative positions on the conduits, substantially as set forth.

3. In a crossing for cable railways, suitable pedestals constructed, substantially as described, for supporting the intersection of the tram-rails, said pedestals being located at right angles to the two lines of cables, substantially as set forth.

4. In combination with a cable-crossing constructed substantially as set forth, the pedestals having an octagonal base, D, supporting-ribs $d$, top extensions, D', and lugs $d^3$, the intersecting tram-rails resting on said extensions between said lugs, said pedestals being connected to the yokes of the conduits by suitable stay-bars, D², substantially as set forth.

5. In a cable-railway crossing, the brackets E, having a base, $e$, supporting-rib $e'$, platform $e^2$, and hooked lug $e^3$, the ends of the tram-rails resting upon said platform, and the slot-rails resting in said lug, substantially as set forth.

6. In combination with a crossing for cable railways constructed substantially as set forth, the two depression-sheaves P P, for lowering one cable below the cable traveling at an angle thereto, substantially as set forth.

7. In combination with a cable-crossing, the two depression-sheaves P P, adapted to rotate upon suitable shafts, one end of said shafts resting in a journal, I, in one side of the conduit-wall, the other end of said shafts being pivoted in a lever-arm, J, said arm resting in a shoulder, $i$, at bottom and detachably connected at top to the slot-rail or other suitable portion of the conduit, substantially as set forth.

WORCESTER HADDOCK.

Attest:
HENRY WOOST,
O. M. HILL.